United States Patent
Uchida et al.

(10) Patent No.: US 6,917,874 B2
(45) Date of Patent: Jul. 12, 2005

(54) APPARATUS FOR CONTROLLING INTERNAL COMBUSTION ENGINE

(75) Inventors: Takefumi Uchida, Toyota (JP); Harufumi Muto, Ann Arbor, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/778,110

(22) Filed: Feb. 17, 2004

(65) Prior Publication Data

US 2004/0230364 A1 Nov. 18, 2004

(30) Foreign Application Priority Data

Feb. 19, 2003 (JP) ........................................ 2003-041742

(51) Int. Cl.⁷ .............................................. G06F 19/00
(52) U.S. Cl. ................ 701/108; 123/568.11; 123/90.15
(58) Field of Search ................................ 701/108, 109, 701/102; 123/90.15, 90.16, 90.17, 568.11, 568.16; 73/118.2

(56) References Cited

U.S. PATENT DOCUMENTS

| | | | |
|---|---|---|---|
| 6,328,007 B1 * | 12/2001 | Hirasawa et al. | 123/90.15 |
| 6,741,924 B2 * | 5/2004 | Iwasaki et al. | 701/114 |
| 6,827,051 B2 * | 12/2004 | Kawasaki et al. | 123/90.15 |
| 2001/0002591 A1 | 6/2001 | Majima | |
| 2004/0015287 A1 | 1/2004 | Ilzuka et al. | |

FOREIGN PATENT DOCUMENTS

| | | |
|---|---|---|
| EP | 1 211 402 A2 | 6/2002 |
| JP | A 9-209895 | 8/1997 |
| JP | A 2002-227687 | 8/2002 |

* cited by examiner

*Primary Examiner*—Hieu T. Vo
(74) *Attorney, Agent, or Firm*—Oliff & Berridge, PLC

(57) ABSTRACT

An electronic control unit corrects ignition timing according to changes in an internal EGR amount accompanying actuation of a variable valve actuation mechanism used in an internal combustion engine. The electronic control unit computes a base correction amount AVVTb based on an engine speed NE and an engine load ratio KL. The control unit multiplies the base correction amount AVVTb by the ratio of a square number of an actual valve overlap amount realOL to a square number of a target valve overlap amount tOL, thereby computing a VVT correction amount AVVT of ignition timing. As result, the engine is easily and properly controlled based on the relationship between the state of the variable valve actuation mechanism and changes in the internal EGR amount.

19 Claims, 8 Drawing Sheets

(Exhaust of Combusted Gas)

(Immediately Before Intake Valve Is Opened)

(Valve Overlap)

Intake or Exhaust Valve Opening ($\mu i A i \leq \mu e A e$)

($\mu e A e < \mu i A i$)

APPARATUS FOR CONTROLLING INTERNAL COMBUSTION ENGINE

BACKGROUND OF THE INVENTION

The present invention relates to an apparatus for controlling an internal combustion engine that has a variable valve actuation mechanism for varying the valve overlap state of intake and exhaust valves.

Internal combustion engines having a variable valve actuation mechanism have been proposed to improve the intake efficiency, decrease NOx, or exhaust emission, and improve the fuel consumption by reducing pumping loss caused by internal EGR. A variable valve actuation mechanism varies the actuation of intake and exhaust valves according to the running state of an engine. For example, variable valve timing mechanisms and variable valve lift mechanisms are widely used for on-vehicle internal combustion engines. A variable valve timing mechanism varies timings of intake and exhaust valves, or valve timing. A variable valve lift mechanism varies the valve lift of intake and exhaust valves.

In an engine having such a variable valve actuation mechanism, the amount of gas remaining in the cylinder, or the amount of internal EGR, changes according to operation of the mechanism, for example, according to changes in the valve overlap of the intake and exhaust valves. In consideration of changes in the amount of internal EGR according to operation of the variable valve actuation mechanism, settings of engine control parameters such as ignition timing are changed. For example, Japanese Laid-Open Patent Publication No. 9-209895 discloses an apparatus for controlling an internal combustion engine having such a variable valve actuation mechanism. The apparatus of the publication changes ignition timing in consideration of changes in the amount of internal EGR according to operation of the variable valve actuation mechanism. Valve overlap refers to a state where an intake valve and an exhaust valve are open at the same time.

The amount of internal EGR changes in a complicated manner according to the engine speed, the engine load, and the state of the variable valve actuation mechanism. However, the apparatus of the above publication does not clearly define the relationship between the state of the variable valve actuation mechanism and changes in the amount of internal EGR amount. Thus, the apparatus can hardly optimize the ignition timing in relation to changes in the internal EGR amount.

Since operation of the variable valve actuation mechanism affects the internal EGR amount, it is considered to be possible to control the internal EGR amount by the variable valve actuation mechanism. However, since the relationship between the state of the variable valve actuation mechanism and changes in the amount of internal EGR amount is not clearly defined, the internal EGR amount cannot be controlled with a high accuracy.

SUMMARY OF THE INVENTION

Accordingly, it is an objective of the present invention to provide an apparatus for controlling an internal combustion engine, which apparatus easily an properly controls the engine based on the relationship between the state of a variable valve actuation mechanism and the amount of internal EGR.

To achieve the foregoing and other objectives and in accordance with the purpose of the present invention, an apparatus for controlling an internal combustion engine is provided. The engine includes an intake valve, an exhaust valve, and a variable valve actuation mechanism. The variable valve actuation mechanism actuates at least one of the valves to change a state of valve overlap, in which the valves are both opened. An internal EGR amount changes according to a state of the variable valve actuation mechanism. The internal EGR amount is the amount of combusted gas that exists in a cylinder of the engine when air-fuel mixture is combusted in the cylinder. The apparatus has a computer. According to changes in the internal EGR amount accompanying actuation of the variable valve actuation mechanism, the computer corrects an engine control amount that is influenced by changes in the internal EGR amount. The computer computes a correction amount used in the correction of the engine control amount based on the ratio of an actual internal EGR amount to a target internal EGR amount, the ratio of an actual valve overlap area to a target valve overlap area, or the ratio of a square number of an actual valve overlap amount to a square number of a target valve overlap amount.

The present invention provides another apparatus for controlling an internal combustion engine. The engine includes an intake valve, an exhaust valve, and a variable valve actuation mechanism. The variable valve actuation mechanism actuates at least one of the valves to change a state of valve overlap, in which the valves are both opened. An internal EGR amount changes according to a state of the variable valve actuation mechanism. The internal EGR amount is the amount of combusted gas that exists in a cylinder of the engine when air-fuel mixture is combusted in the cylinder. The apparatus has a controller, which controls the variable valve actuation mechanism to adjust the internal EGR amount to a predetermined target internal EGR amount. The controller controls the variable valve actuation mechanism such that a valve overlap area of the intake and exhaust valves becomes a value obtained by multiplying an actual valve overlap area by the ratio of the target internal EGR amount to an actual internal EGR amount or such that a valve overlap amount of the intake and exhaust valves becomes a value obtained by multiplying an actual valve overlap amount by the square root of the ratio of the target internal EGR amount to an actual EGR amount.

Further, the present invention provides an apparatus for controlling an internal combustion engine. The engine includes an intake valve, an exhaust valve, and a variable valve actuation mechanism. The variable valve actuation mechanism actuates at least one of the valves to change a state of valve overlap, in which the valves are both opened. An internal EGR amount changes according to a state of the variable valve actuation mechanism. The internal EGR amount is the amount of combusted gas that exists in a cylinder of the engine when air-fuel mixture is combusted in the cylinder. The apparatus has a controller, which controls the variable valve actuation mechanism to adjust the internal EGR amount to a predetermined target internal EGR amount. The controller computes a basic valve overlap area based on a rotation speed of the engine and load applied to the engine. The controller also computes a basic internal EGR amount that is an internal EGR amount when a valve overlap area of the intake and exhaust valves is equal to the basic valve overlap area. The controller controls the variable valve actuation mechanism such that the valve overlap area becomes a value obtained by multiplying the basic valve overlap area by the ratio of the target internal EGR amount to the basic internal EGR amount.

The present invention also provides another apparatus for controlling an internal combustion engine. The engine includes an intake valve, an exhaust valve, and a variable valve actuation mechanism. The variable valve actuation mechanism actuates at least one of the valves to change a state of valve overlap, in which the valves are both opened. An internal EGR amount changes according to a state of the variable valve actuation mechanism. The internal EGR amount is the amount of combusted gas that exists in a cylinder of the engine when air-fuel mixture is combusted in the cylinder. The apparatus has a controller, which controls the variable valve actuation mechanism to adjust the internal EGR amount to a predetermined target internal EGR amount. The controller computes a basic valve overlap amount based on a rotation speed of the engine and load applied to the engine. The controller also computes a basic internal EGR amount that is an internal EGR amount when a valve overlap amount of the intake and exhaust valves is equal to the basic valve overlap amount. The controller controls the variable valve actuation mechanism such that the valve overlap amount becomes a value obtained by multiplying the basic valve overlap amount by the square route of the ratio of the target internal EGR amount to the basic internal EGR amount.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An apparatus for controlling an internal combustion engine according to a first embodiment of the present invention will now be described with reference to the drawings.

Figure 1:
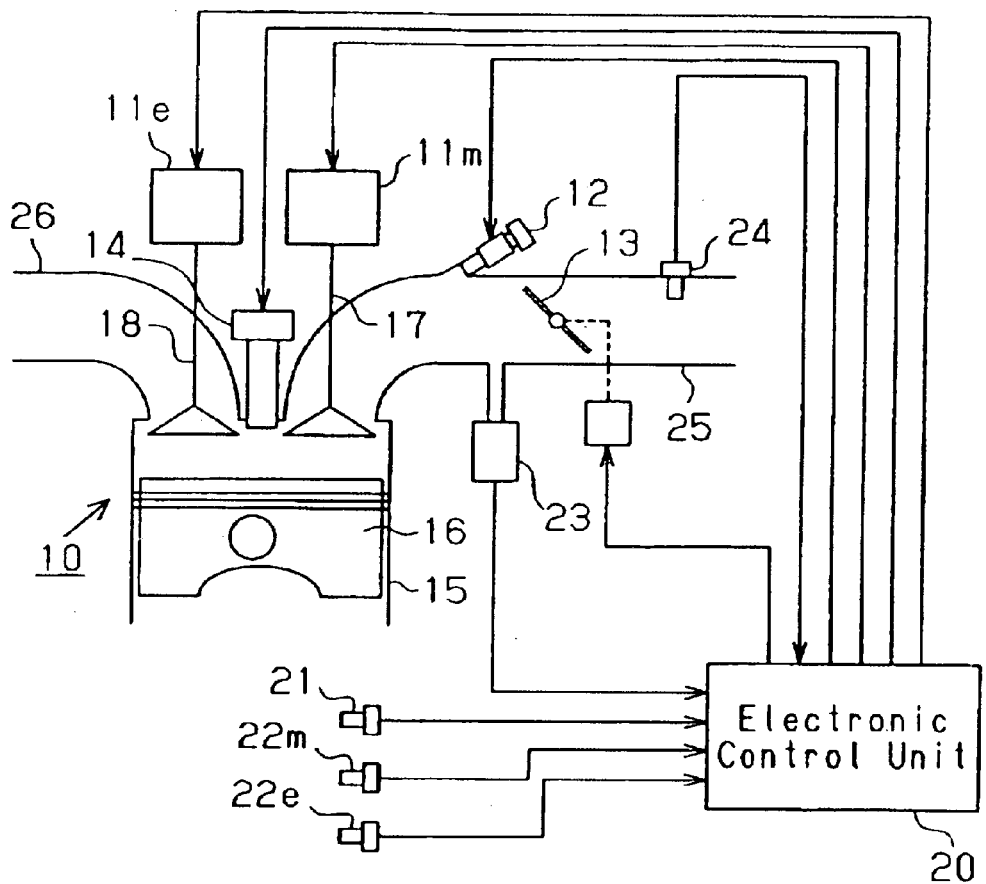
FIG. 1 is a diagrammatic view showing an overall configuration of a first embodiment according to the present invention.

As shown in FIG. 1, an internal combustion engine 10 of this embodiment includes one or more cylinders 15, each of which accommodates a piston 16, at least one intake valve 17, and at least one exhaust valve 18. Each intake valve 17 and each exhaust valve 18 correspond to one of the cylinders 15. An intake pipe 25, which is an intake passage, is coupled to the cylinder 15. The intake valve 17 selectively connects and disconnects the intake pipe 25 with the cylinder 15. An exhaust pipe 26, which is an exhaust passage, is coupled to the cylinder 15. The exhaust valve 18 selectively connects and disconnects the exhaust pipe 26 with the cylinder 15.

The engine 10 has various sensors that detect the running state of the engine 10. For example, a crank angle sensor 21 is provided in the vicinity of a crankshaft, which is an output shaft of the engine 10. Cam angle sensors 22$m$, 22$e$ are provided in the vicinity of an intake camshaft and an exhaust camshaft, respectively. Further, an intake pipe pressure sensor 23 and an air flow meter 24, which is a flow rate sensor, are provided in the intake pipe 25. Detected signals of these sensors are sent to an electronic control unit 20, which performs various controls of the engine 10. The electronic control unit 20 is a controller including a computer.

The electronic control unit 20 monitors the running state of the engine 10 based on detected signals of the sensors. For example, the rotational phase of the crankshaft, or the crank angle, is obtained from detected signals of the crank angle sensor 21. The engine speed NE is also obtained from signals from the crank angle sensor 21. Rotational phases of the intake camshaft and the exhaust camshaft, or cam angles, are obtained from detected signals of the cam angle sensors 22$m$, 22$e$. Further, the pressure Pm in the intake pipe 25 is obtained from detected signals of the intake pipe pressure sensor 23, and the intake air amount GA is obtained from detected signals of the air flow meter 24.

Based on the running state of the engine 10, which is monitored based on the detection results of the sensors, the electronic control unit 20 performs various controls of the engine 10. For example, the electronic control unit 20 outputs command signals to an injector 12, an ignition plug 14, and a throttle valve 13 of the engine 10 according to the running state of the engine 10, thereby controlling fuel injection, ignition timing, and the amount of intake air.

The engine 10 has two variable valve actuation mechanisms 11$m$, 11$e$. The variable valve actuation mechanisms 11$m$, 11$e$ vary the valve timing of the intake valve 17 and the exhaust valve 18, respectively. In this embodiment, the variable valve actuation mechanisms 11$m$, 11$e$ change the rotational phases of the intake and exhaust valves 17, 18 relative to the crankshaft, which is an output shaft of the engine, thereby varying the valve timings of the intake and the exhaust valves 17, 18.

Based on control of the variable valve actuation mechanisms 11$m$, 11$e$, the electronic control unit 20 performs a valve timing control, or varies the valve timing of the intake and exhaust valve 17, 18. The valve timing control in this embodiment is performed in the following manner by the electronic control unit 20.

First, based on an engine speed NE and an engine load, target valve timing tVTm and target valve timing tVTe, which are target values of the valve timing of the intake and exhaust valves 17, 18, are computed. The variable valve actuation mechanisms 11m, 11e are operated such that actual valve timings realVTm, realVTe of the intake and exhaust valves 17, 18, which are detected by the cam angle sensors 22m, 22e, seek the computed target valve timings tVTm, tVTe.

Figure 2:
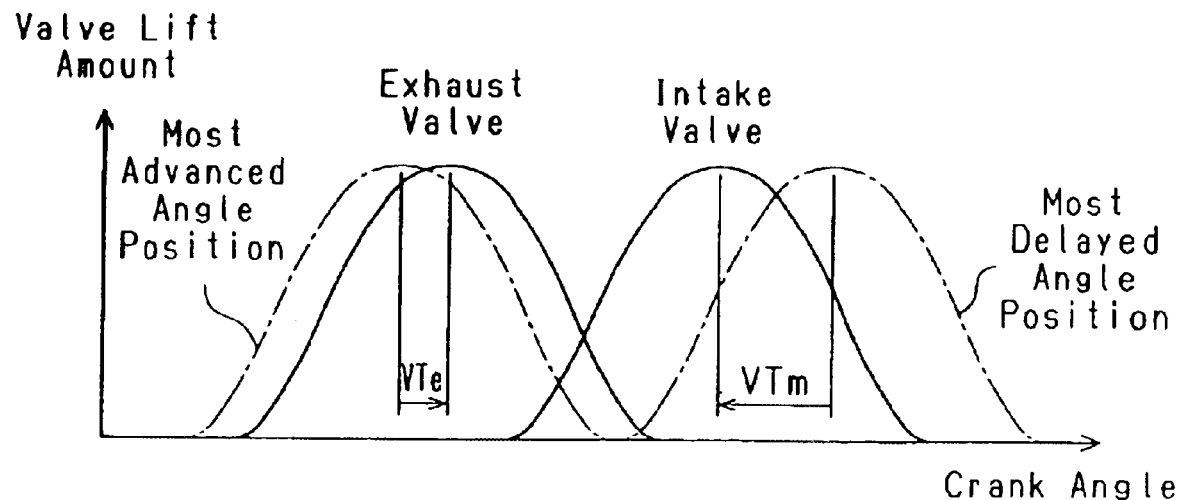
FIG. 2 is a graph showing an example of settings of the valve timing according to the first embodiment.

In this embodiment, the valve timing VTm refers to the amount of an advancement of the opening timing of the intake valve 17, which amount is expressed in units of crank angle, as shown in FIG. 2. Also, the valve timing VTe refers to the amount of a delay of the opening timing of the exhaust valve 18, which amount is expressed in units of crank angle, as shown in FIG. 2. The valve timing VTm of the intake valve 17 is represented by the amount of advancement [° CA] in relation to the most delayed angle position, at which the opening and closing of the intake valve 17 are most delayed in the range of the valve timing varied by the variable valve actuation mechanism 11m. The valve timing VTe of the exhaust valve 18 is represented by the amount of delay [° CA] in relation to the most advanced angle position, at which the opening and closing of the exhaust valve 18 are most advanced in the range of the valve timing varied by the variable valve actuation mechanism 11e.

When the valve timings of the intake and exhaust valves 17, 18 are changed, the internal EGR amount is increased or decreased. The optimum ignition timing is changed, accordingly. Therefore, in this embodiment, the ignition timing is corrected in consideration of changes in the internal EGR amount, which relies on changes in the valve timings of the intake and exhaust valves 17, 18, by the variable valve actuation mechanisms 11m, 11e. Hereinafter, correction of the ignition timing according to this embodiment will be described.

[Computation of Internal EGR Amount $M_{egrALL}$]

Computation of the internal EGR amount $M_{egrALL}$ at a given engine speed will now be described. As described above, the internal EGR amount $M_{egrALL}$ changes according not only to the engine speed NE and the engine load, but also, the states of the variable valve actuation mechanisms 11m, 11e. Such changes in the internal EGR amount $M_{egrALL}$ are easily an properly detected using a valve overlap area AOL of the intake and exhaust valves 17, 18 or a valve overlap amount OL.

(Behavior of Combusted Gas in Cylinder 15)

The behavior of combusted gas in the cylinder 15 of the engine 10 will now be discussed.

Figure 3A:
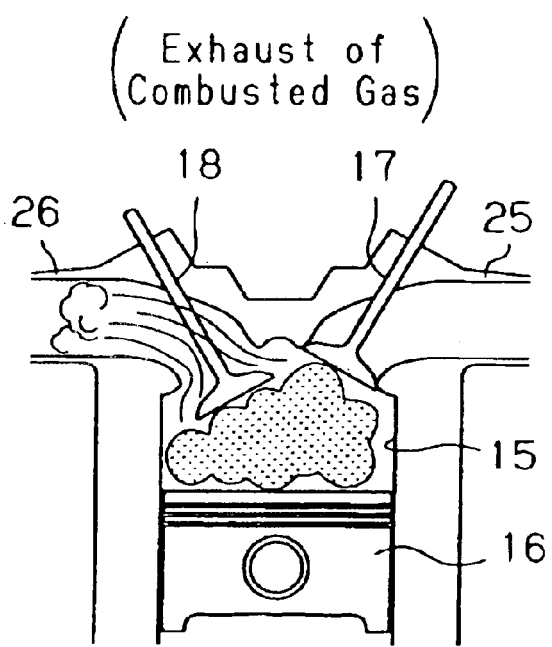
FIGS. 3A to 3C are diagrammatic views illustrating behavior of combusted gas in an internal combustion engine.

Combustion of fuel in the cylinder 15 produces combusted gas. The combusted gas is exhausted to the exhaust pipe 26 when the exhaust valve 18 opens (see FIG. 3A). Thereafter, the intake valve 17 is opened so that valve overlap is started. Due to the difference between a pressure Pe in the exhaust pipe and a pressure Pm in the intake pipe, some of the combusted gas flows back to the cylinder 15 from the exhaust pipe 26 (see FIG. 1C). At this time, some of the combusted gas flows through the cylinder 15 and enters the intake pipe 25. This portion of the combusted gas will be drawn into the cylinder 15 together with new air in the subsequent intake stroke. In this description, part of combusted gas that flows back to the cylinder 15 from the exhaust pipe 26 during valve overlap after the intake valve 17 is opened is referred to as backflow combusted gas. The amount of backflow combusted gas is referred to as backflow combusted gas amount $M_{egr2}$.

Figure 3B:
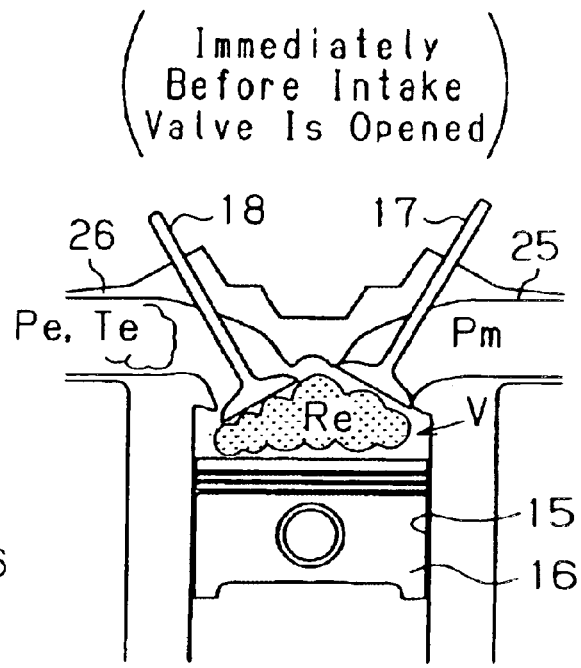
Figure 3C:
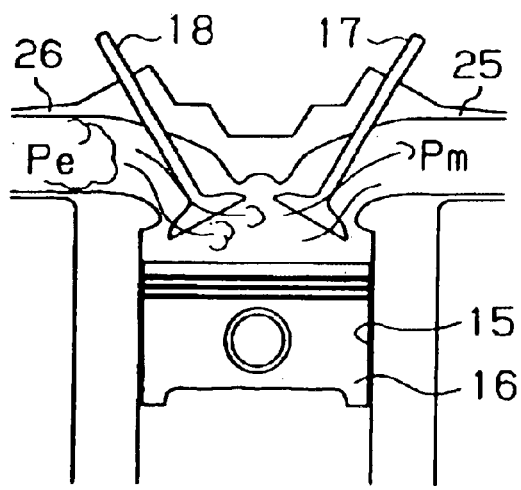

On the other hand, immediately before the intake valve 17 is opened, some of combusted gas remains in the cylinder 15 without being discharged to the exhaust pipe 26 (see FIG. 3B). A portion of the remaining combusted gas continues staying in the cylinder 15, while the remainder, due to a backflow of exhaust, temporarily flows back into the intake pipe 25 during valve overlap, and is then drawn into the cylinder 15 again during the subsequent intake stroke. Therefore, the entire portion of the combusted gas that remains in the cylinder 15 until immediately before opening of the intake valve 17 will exist in the cylinder 15 in the subsequent combustion. The part of combusted gas that remains in the cylinder 15 immediately before opening of the intake valve 17 is referred to as remaining combusted gas. The amount of the remaining combusted gas is referred to as remaining combusted gas amount $M_{egr1}$.

Accordingly, the internal EGR amount that exists in the cylinder 15 in a combustion is computed by the following equation (1), in which the estimated internal EGR amount is represented by $M_{egrALL}$. In the equation (1), the estimated internal EGR amount $M_{egrALL}$ is expressed as the sum of the remaining combusted gas amount $M_{egr1}$ and the backflow combusted gas amount $M_{egr2}$.

$$M_{egrALL} = M_{egr1} + M_{egr2} \tag{1}$$

(Computation of Remaining Combusted Gas Amount $M_{egr1}$)

The remaining combusted gas amount $M_{egr1}$ is expressed by the following equation (2), which is a gas state equation based on the state in the cylinder 15 immediately before the intake valve 17 is opened. In the equation (2): Pm represents the pressure in the intake pipe; Pe represents the pressure in the exhaust pipe 26; Re represents the gas constant of the combusted gas; Te represents the exhaust temperature (the temperature of combusted gas passing through the exhaust pipe 26, or the temperature of exhaust gas); V represents the volume of the cylinder 15 immediately before the intake valve 17 is opened.

$$M_{egr1} = \frac{Pe \cdot V}{Re \cdot Te} \tag{2}$$

The cylinder volume V immediately before the intake valve 17 is open is computed by the following equation (3) based on the timing of opening of the intake valve opening timing $T_{open}$ (BTDC), the bore diameter $r_b$ of the cylinder, the stroke S of the piston 16, and the volume of the combustion chamber when the piston 16 is at the top dead center, or the clearance volume Vc.

$$V = Vc + \pi \frac{r_b^2}{4} \frac{S}{2} \{1 - \sin(T_{open})\} \tag{3}$$

In the equation (3), the cylinder bore diameter $r_b$, the stroke S, and the clearance volume Vc are constants that are determined by design dimensions. Therefore, in the case of an internal combustion engine having the variable valve actuation mechanisms 11m, 11e, the cylinder volume V is computed as a function $f_2(T_{open})$ of the intake valve opening timing.

(Computation of Backflow Combustion Gas Amount $M_{egr2}$)

Figure 4:
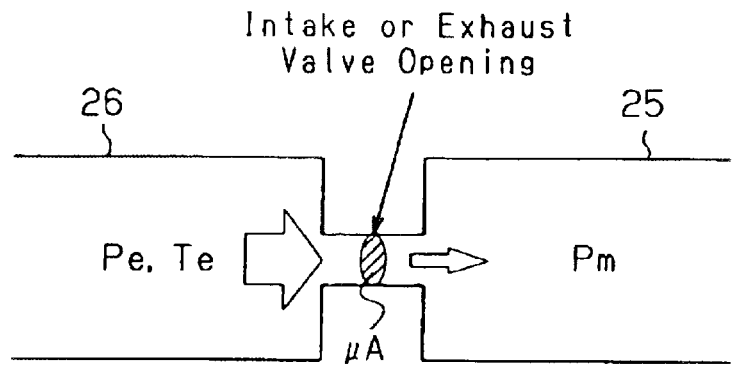
FIG. 4 is a diagram showing backflow of combusted gas from an exhaust pipe.

During valve overlap, due to the difference between the exhaust pipe pressure Pe and the intake pipe pressure Pm, combusted gas flows from the exhaust pipe 26 to the intake pipe 25. That is, the combusted gas from the exhaust pipe 26 flows through the cylinder 15. In this state, in the path of the combusted gas, the opening between the intake pipe 25 and the cylinder 15 defined by the intake valve 17 (the intake valve opening) and the opening between the exhaust pipe 26 and the cylinder 15 defined by the exhaust valve 18 (the exhaust valve opening) function as restrictions each having a reduced area. Therefore, the behavior of the combusted gas flow is expressed by a diagram of FIG. 4. The flow rate Q of combusted gas can be computed using an equation for computing the flow rate at the sections of the restrictions.

The following equation (4) is used as the equation for computing the flow rate at a part functioning as a restriction. In the equation (4): $\kappa$ represents the ratio of specific heat of combusted gas, $\mu$ represents the flow coefficient, and A represents the opening area of the valve.

$$Q = \mu A \frac{Pe}{\sqrt{Re \cdot Te}} \Phi\left(\frac{Pm}{Pe}\right) \quad (4)$$

When an inequality $1/(\kappa+1) < Pm/Pe$ is satisfied, $\Phi(Pm/Pe)$ in the equation (4) is represented by the following equation (5).

$$\Phi\left(\frac{Pm}{Pe}\right) = \sqrt{\left\{\frac{\kappa-1}{2\kappa} \cdot \left(1 - \frac{Pm}{Pe}\right) + \frac{Pm}{Pe}\right\} \cdot \left(1 - \frac{Pm}{Pe}\right)} \quad (5)$$

When an inequality $1/(\kappa+1) \geq Pm/Pe$ is satisfied, $\Phi(Pm/Pe)$ in the equation (4) is represented by the following equation (6).

$$\Phi\left(\frac{Pm}{Pe}\right) = \sqrt{\frac{\kappa}{2(\kappa+1)}} \quad (6)$$

Therefore, the amount of combusted gas that is drawn back into the cylinder 15, or the backflow combusted gas amount $M_{egr2}$, can be computed as a time integral of the flow rate of combusted gas at the restriction during valve overlap. Since the intake pipe pressure Pm, the exhaust pipe pressure Pe, the exhaust temperature Te, and the ratio of specific heat $\kappa$ are not abruptly changed, these values are assumed to be substantially constant during valve overlap. Therefore, the backflow combusted gas amount $M_{egr2}$ is computed as a value that is in proportion to the time integral $\Sigma(\mu A)$ of an effective valve opening area $\mu A$ ($\mu A$=flow constant $\mu \times$ valve opening area A). Thus, the backflow combusted gas amount $M_{egr2}$ can be expressed by the following equation (7).

$$M_{egr2} = \Sigma(\mu A) \cdot \frac{Pe}{\sqrt{Re \cdot Te}} \cdot \Phi\left(\frac{Pm}{Pe}\right) \quad (7)$$

(Computation of Time Integral $\Sigma(\mu A)$ of Effective Valve Opening Area)

Figure 5A:
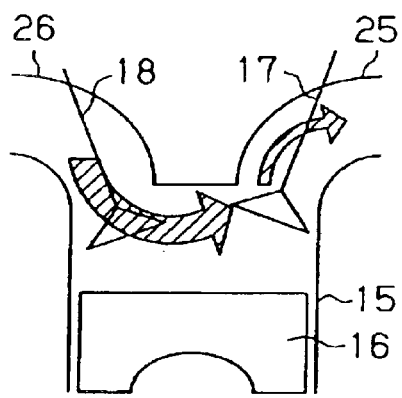
FIGS. 5A and 5B are diagrammatic views showing the behavior of combusted gas that flows back from an exhaust pipe.
Figure 5B:
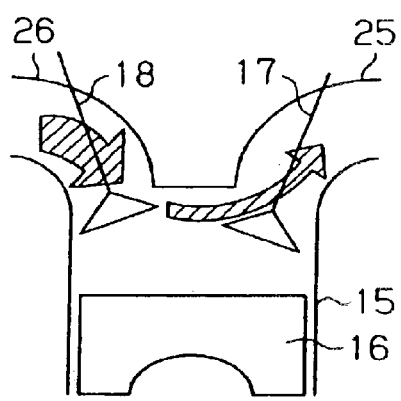

When exhaust flows back during valve overlap, if the effective valve opening area $\mu_i A_i$ of the intake valve 17 is less than the effective valve opening area $\mu_e A_e$ of the exhaust valve 18 as shown in FIG. 5A, the intake valve functions as a restriction. If the effective valve opening area $\mu_e A_e$ of the exhaust valve 18 is less than the effective opening area $\mu_i A_i$ of the intake valve 17 as shown in FIG. 5B, the exhaust valve 18 functions as a restriction. In short, one of the exhaust valve 18 and the intake valve 17 that has a smaller effective valve opening area $\mu A$ functions as a restriction. Thus, the time integral $\Sigma(\mu A)$ of the effective valve opening area (effective restriction opening area) is expressed by an equation (8). The time integral $\Sigma(\mu A)$ is a time integral during valve overlap.

$$\Sigma(\mu A) = \sum_{\mu_e A_e < \mu_i A_i}(\mu_e A_e) + \sum_{\mu_i A_i \leq \mu_e A_e}(\mu_i A_i) \quad (8)$$

Figure 6:
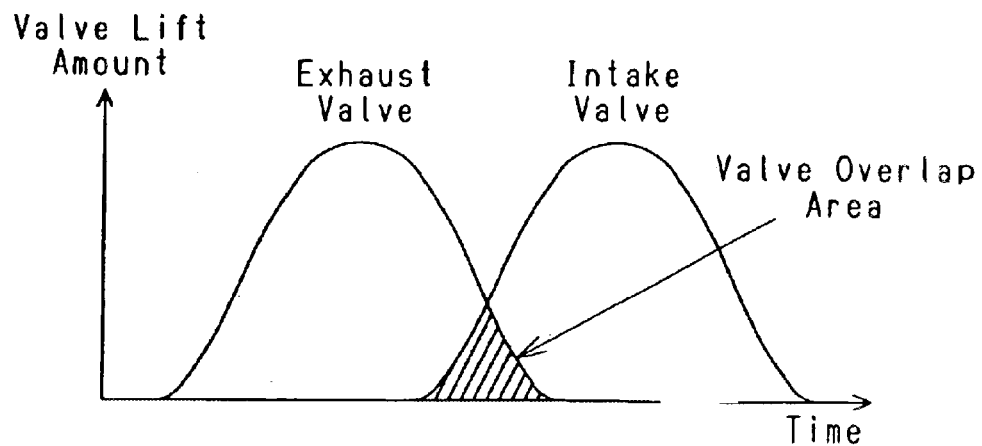
FIG. 6 is a graph showing changes in the valve lift of an intake valve and an exhaust valve.

If the exhaust valve 18 and the intake valve 17 are assumed to have the same flow coefficient $\mu$ ($\mu_i = \mu_e = \mu$), the equation (8) can be altered to the following equation (9). In an equation (9), the formula in the parentheses on the right side represents the area of a hatched section of valve overlap defined by valve lift curves in FIG. 6, or an valve overlap area AOL.

$$\Sigma(\mu A) = \mu\left(\sum_{A_e < A_i} A_e + \sum_{A_i \leq A_e} A_i\right) \quad (9)$$

In the case of an internal combustion engine having the variable valve actuation mechanisms 11$m$, 11$e$, which change the opening and closing timing of the intake valve 17 and the exhaust valve 18, or the valve timing, the valve overlap area AOL is changed according to the settings of the valve timing of the intake and exhaust valves 17, 18. Since the instantaneous values of the effective valve opening area $\mu A$ is determined by design dimensions such as the cam profile, the time integral $\Sigma(\mu A)$ is computed as a function of the valve overlap amount OL of the intake and exhaust valves 17, 18 and the engine speed NE. That is, the valve overlap amount OL represents valve overlap in units of crank angle. Therefore, if the effective valve opening area $\mu A$ is integrated with respect to the crank angle, a function $f_1(OL)$, which is only related to the valve overlap amount OL, is obtained. Then, if the crank angle integration is divided by the engine speed NE, the valve overlap area AOL, or the time integral $\Sigma(\mu A)$ of the effective valve opening area, is obtained. Therefore, the equation (9) can be altered to the following equation (10). If the equation (10) is substituted into the equation (7), the following equation (11) is obtained.

$$\Sigma(\mu A) = \frac{f_1(OL)}{NE} \quad (10)$$

$$M_{egr2} = \frac{f_1(OL)}{NE} \times \frac{Pe}{\sqrt{Re \cdot Te}} \cdot \Phi\left(\frac{Pm}{Pe}\right) \quad (11)$$

(Computation of Internal EGR Amount $M_{egrALL}$)

The internal EGR amount $M_{egrALL}$ that exists in the cylinder 15 during combustion is the sum of the remaining combusted gas amount $M_{egr1}$ expressed by the equation (2) and the backflow combusted gas amount $M_{egr2}$ expressed by the equation (11). That is, the internal EGR amount $M_{egrALL}$ is expressed by the following equation (12).

$$M_{egrALL} = \frac{Pe}{Re \cdot Te} \times f_2(T_{open}) + \frac{f_1(OL)}{NE} \times \frac{Pe}{\sqrt{Re \cdot Te}} \cdot \Phi\left(\frac{Pm}{Pe}\right) \quad (12)$$

The exhaust pipe pressure Pe and the exhaust temperature Te can be estimated from the running state of the engine. That is, the exhaust pipe pressure Pe and the exhaust temperature Te are computed as functions of the engine speed NE and the engine load. Therefore, if the exhaust pipe pressure Pe and the exhaust temperature Te are not measured or estimated, these values can be obtained as functions of the engine speed NE and a parameter representing the engine load such as an engine load factor KL (the ratio of the current load to the maximum load WOT), an intake air amount GA, and the intake pipe pressure Pm.

Figure 7:
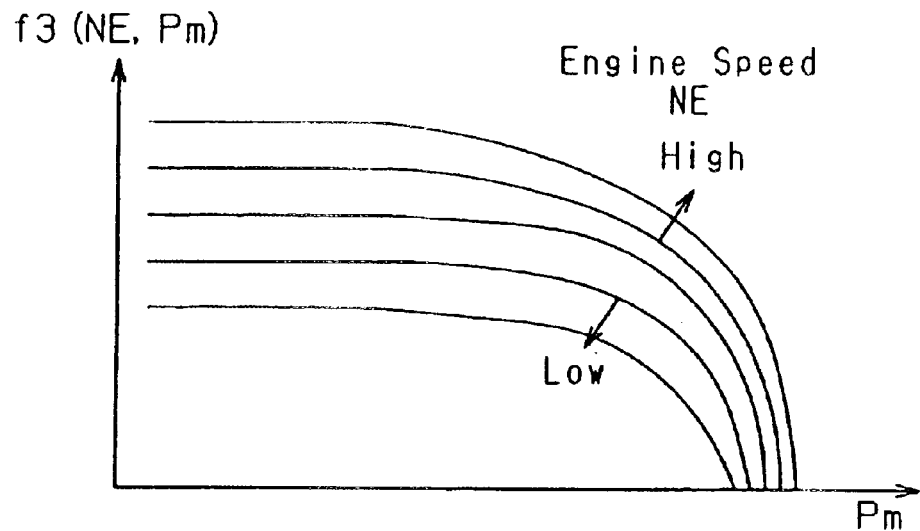
FIG. 7 is a graph showing an example of a function $f_3$ (NE, Pm)

If the intake pipe pressure Pm is used as an indicator of the engine load, the equation (11) can be expressed as the following equation (13), which is a function of the valve overlap amount OL, the engine speed NE, and the intake pipe pressure Pm. FIG. 7 shows an example of the settings of such a function $f_3(NE, Pm)$.

$$M_{egr2} = \frac{f_1(OL)}{NE} \times f_3(NE, Pm) \tag{13}$$

If $(Pe/(Re \cdot Te))$ in the equation (2) is expressed as a function $f_4$ (NE,Pm) of the engine speed NE and the intake pipe pressure Pm, the remaining combusted gas amount $M_{egr1}$ is expressed by an equation (14).

$$M_{egr1} = f_4(NE, Pm) \times f_2(T_{open}) \tag{14}$$

In this case, the internal EGR amount $M_{egrALL}$ is expressed by the following equation (15), or a function of the engine speed NE, the intake pipe pressure Pm, the valve overlap amount OL, and the intake valve opening timing $T_{open}$.

$$M_{egrALL} = f_4(NE, Pm) \times f_2(T_{open}) + \frac{f_1(OL)}{NE} \times f_3(NE, Pm) \tag{15}$$

[Computation of VVT Correction Amount AVVT of Ignition Timing]

As described above, the internal EGR amount at a given running state of the engine 10 can be expressed using the engine speed NE, the intake pipe pressure Pm, and the valve overlap amount OL of the intake and exhaust valves 17, 18 (or the valve overlap area AOL). Accordingly, the ignition timing is corrected in the following manner in accordance with the internal EGR amount, which corresponds to operation of the variable valve actuation mechanisms 11m, 11e.

Figure 8:
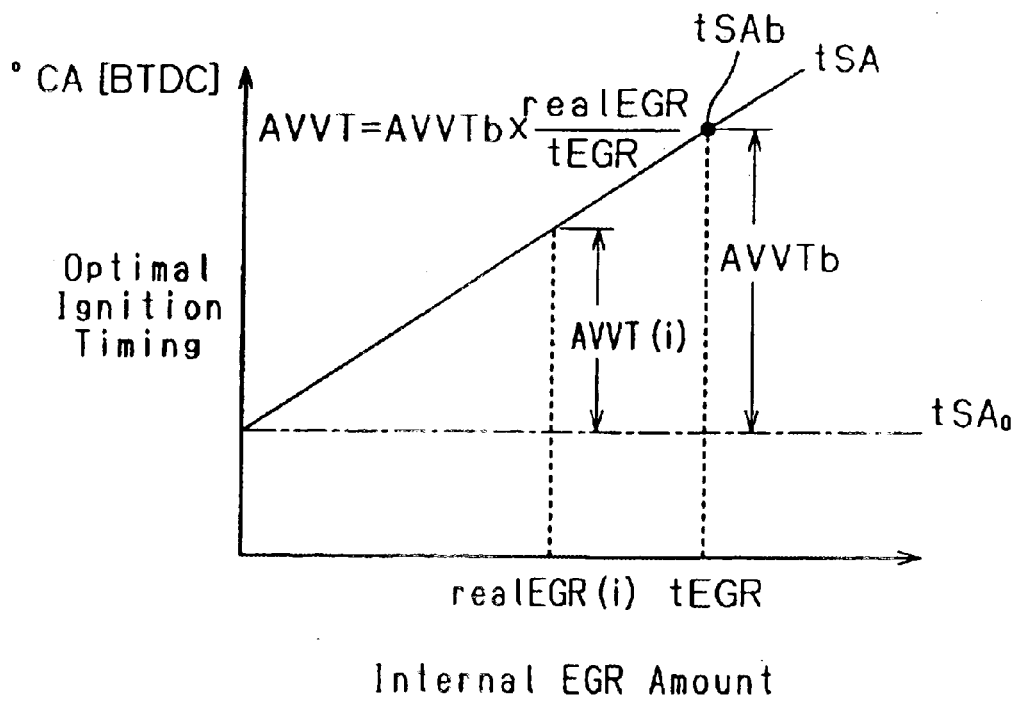
FIG. 8 is a graph showing the relationship between an internal EGR amount and an optimal ignition timing.

FIG. 8 shows changes in an optimal ignition timing tSA at a given engine speed and a given engine load, which ignition timing tSA corresponds to changes of the internal EGR amount. As the internal EGR amount is increased as shown in FIG. 8, the optimal ignition timing tSA is advanced. This is partly because an increase in the internal EGR amount reduces the combustion speed of fuel in the cylinder 15.

If the valve timing of the intake and exhaust valves 17, 18 are determined solely by a given values of the engine speed and the engine load, the internal EGR amount is solely response delays of the variable valve actuation mechanisms 11m, 11e accompanying changes in the valve timing of the intake and exhaust valves 17, 18, the actual valve timings VTm, VTe can differ from the target valve timings tVTm, tVTe. Therefore, to correct the ignition timing according to the actual internal EGR amount, changes in the internal EGR amount due to the differences between the actual valve timing VTm, VTe and the target valve timing tVTm, tVTe must be taken into consideration.

In this description, the optimum ignition timing when the internal EGR amount is zero is referred to a reference ignition timing tSA0. The internal EGR amount when the actual valve timings VTm, VTe of the intake and exhaust valves 17, 18 are equal to the target valve timings tVTm, tVTe is referred to as a target internal EGR amount tEGR. The difference between the optimum ignition timing tSAb and the reference ignition timing tSA0 when the internal EGR amount is equal to the target internal EGR amount tEGR is referred to as a base correction amount AVVTb. The reference ignition timing tSA0, the target internal EGR amount tEGR, and the base correction amount AVVTb are determined solely by the engine speed and the engine load. The relationship of the target internal EGR amount tEGR and the base correction amount AVVTb to the engine speed and the engine load can be obtained through experiments beforehand.

Using the reference ignition timing tSA0, the target internal EGR amount tEGR, and the base correction amount AVVTb, the ignition timing tSAb is expressed by the following equation (16).

$$tSAb = tSA0 + AVVTb \tag{16}$$

Further, if the optimal ignition timing tSA and the

Further, if the optimal ignition timing tSA and the internal EGR amount are in linear correspondence as shown in FIG. 8, the correction amount of the ignition timing, or the VVT correction amount AVVT, which corresponds to changes in the internal EGR amount due to operation of the variable valve actuation mechanisms 11m, 11e, is expressed by the following equation (17). That is, the VVT correction amount AVVT can be regarded as a value that is in proportionate to a ratio $r_{egr}$ of the actual internal EGR amount realEGR to the target internal EGR amount tEGR (realEGR/tEGR).

$$AVVT = AVVTb \times \frac{realEGR}{tEGR} \tag{17}$$

The internal EGR amount $M_{egrALL}$ at a given engine speed is represented by the sum of the remaining combusted gas amount $M_{egr1}$ and the backflow combusted gas amount $M_{egr2}$ as shown in the equation (1). Therefore, the ratio $r_{egr}$ is expressed by the following equation (18). In the equation (18), rear$M_{egr1}$ and rear$M_{egr2}$ are current value of the remaining combusted gas amount and the backflow combusted gas amount. $tM_{egr1}$ and $tM_{egr2}$ represent the remaining combusted gas amount and the backflow combusted gas amount when the valve timings of the intake and exhaust valves 17, 18 are equal to the target vale timings tVTm, tVTe.

$$r_{egr}\left(= \frac{realEGR}{tEGR}\right) = \frac{realM_{egr1} + realM_{egr2}}{tM_{egr1} + tM_{egr2}} \tag{18}$$

Since the temperature of combusted gas remaining in the cylinder 15 when the intake valve 17 is opened is significantly high, and the density of the gas is low, the remaining combusted gas amount $M_{egr1}$ is generally extremely small compared to the backflow combusted gas amount $M_{egr2}$ ($M_{egr1} << M_{egr2}$). Therefore, if the ratio is assumed to have the value above, the equation (18) can be approximated by the following equation (19).

$$r_{egr} = \frac{realM_{egr2}}{tM_{egr2}} \tag{19}$$

If the equation (13), which expresses the backflow combusted gas amount $M_{egr2}$, is substituted into the equation (19), the following equation (20) is obtained. In the equation (20), realOL, realNE, and realPm represents the current values of valve overlap amount, the engine speed, and the intake pipe pressure, respectively. tOL, tNE, tPm represent values of the valve overlap amount, the engine speed, and the intake pipe pressure, respectively, when the valve timings of the intake and exhaust valves 17, 18 are equal to the target valve timings tVTm, tVTe.

$$r_{egr} = \frac{f_1(realOL)/realNE \times f_3(realNE, realPm)}{f_1(tOL)/tNE \times f_3(tNE, tPm)} \quad (20)$$

Since transitional changes in the valve timings of the intake and exhaust valves 17, 18 do not directly affect the engine speed NE and the intake pipe pressure Pm, the engine speed NE and the intake pipe pressure Pm are regarded to be substantially constant while the valve timings are being changed. Therefore, the equations realNE=tNE and realPm=tPm are satisfied, and the equation (20) can be simplified as the following equation (21).

$$r_{egr}\left(=\frac{realEGR}{tEGR}\right) = \frac{f_1(realOL)}{f_1(tOL)} \quad (21)$$

As described above, the function $f_1(OL)$ represents the valve overlap area AOL of the intake and exhaust valves 17, 18. Thus, the ratio $r_{egr}$ can be expressed as a ratio of the actual valve overlap area realAOL, which is the current value of the valve overlap area, to a target valve overlap area tAOL, which is a value of the valve overlap area when the valve timings of the intake and exhaust valves 17, 18 are equal to the target values.

Figure 9:
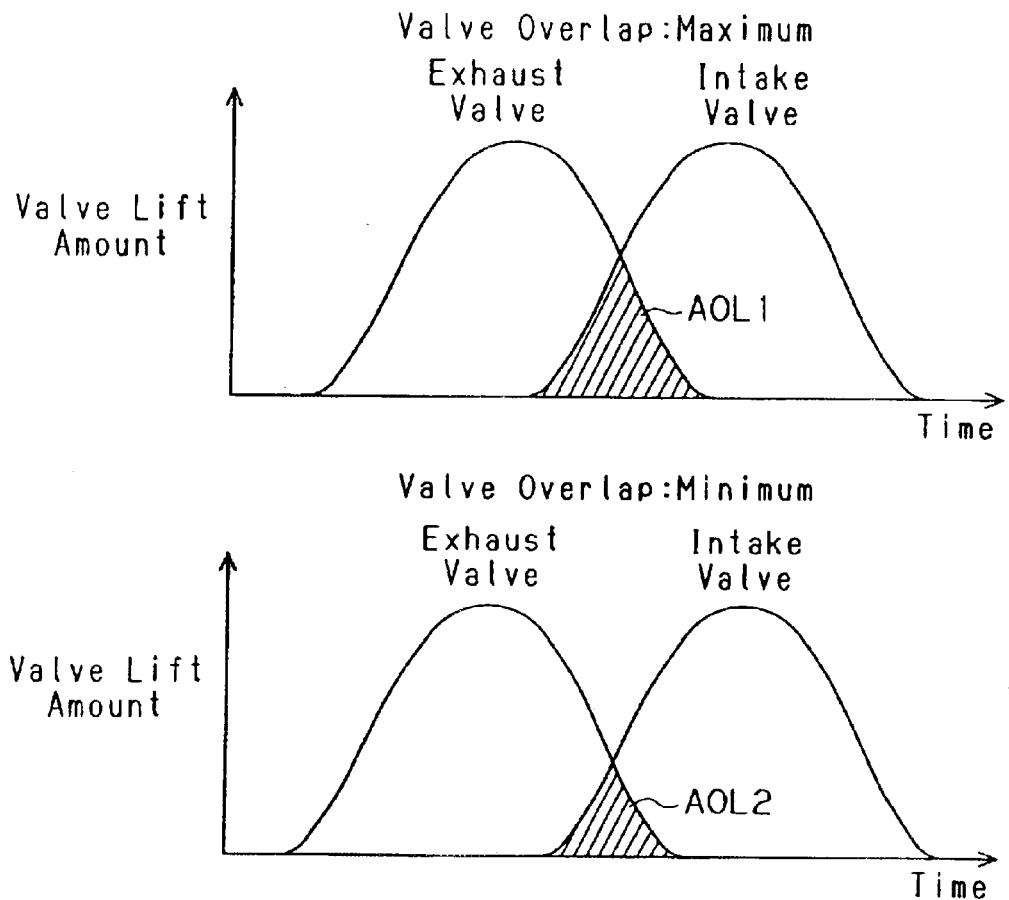
FIG. 9 is a graph showing changes of valve lift curves according to changes in the amount of valve overlap.

As shown in FIG. 9, although the valve overlap amount OL is changed, the valve overlap area AOL1 and the valve overlap AOL2 are substantially geometrically similar. If the valve overlap areas AOL1 and AOL2 are assumed to be geometrically similar despite the difference in the valve overlap amount, the valve overlap area AOL of a given value of the valve overlap amount OL is approximated by a value that is proportionate to the square of the valve overlap amount OL. Therefore, the equation (21) can be expressed as the following equation (22).

$$r_{egr} = \left(=\frac{realEGR}{tEGR}\right) = \frac{(realOL)^2}{(tOL)^2} \quad (22)$$

If the equations (21), (22) are substituted into the equation (17), the following equations (23), (24) are obtained. That is, the VVT correction amount AVVT of the ignition timing is computed based on the ratio of the actual valve overlap area realAOL to the target valve overlap area tAOL or on the ratio of the square number of the actual valve overlap amount realOL to the square number of target vale overlap amount tOL.

$$AVVT = AVVTb \times \frac{f_1(realOL)}{f_1(tOL)} \quad (23)$$

$$AVVT = AVVTb \times \frac{(realOL)^2}{(tOL)^2} \quad (24)$$

Figure 10:
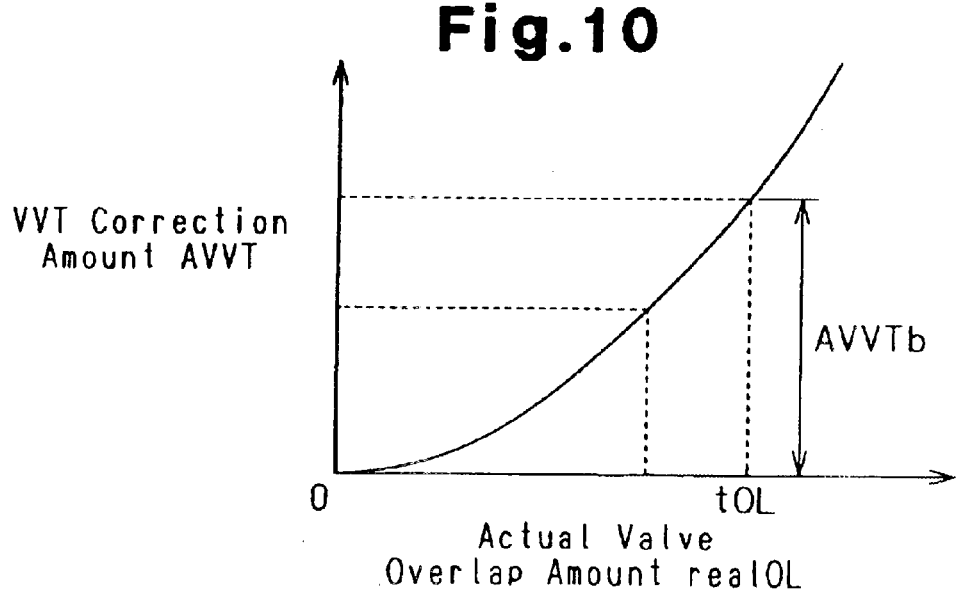
FIG. 10 is a graph showing the relationship between an actual valve overlap amount and a VVT correction amount.

FIG. 10 shows the relationship between the VVT correction amount AVVT and the valve overlap amount OL at a given engine speed and a given engine load. The relationship is expressed by the equation (24). As shown in FIG. 10, when the engine speed and the engine load are constant, the VVT correction, amount AVVT is proportionate to the square number of the actual valve overlap amount realOL.

In this embodiment, when setting the ignition timing, the electronic control unit 20 corrects the ignition timing using the VVT correction amount AVVT, which is computed using the equation (24). A method for computing the VVT correction amount AVVT according to this embodiment will now be described with reference to FIG. 11.

Figure 11:
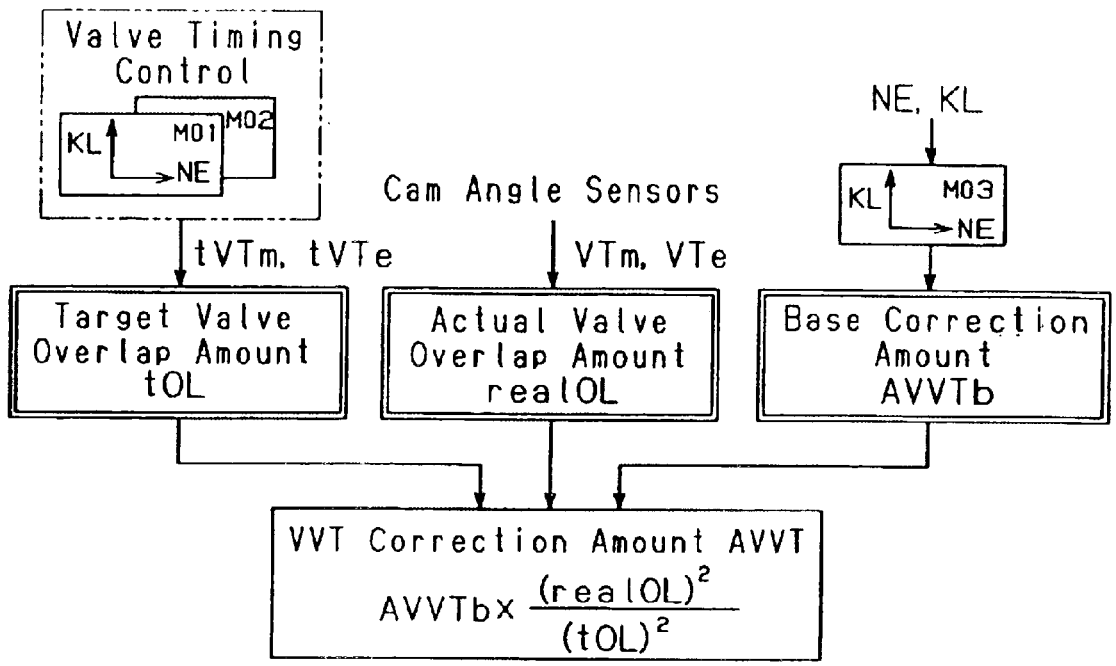
FIG. 11 is a block diagram showing a logic for computing a VVT correction amount to the first embodiment.

FIG. 11 is a block diagram of processes for computing the VVT correction amount AVVT. As shown in FIG. 11, the target valve overlap amount tOL is computed using the target valve timings tVTm, tVTe of the intake and exhaust valves 17, 18, which are computed in the above described valve timing control. In the valve timing control described above, the target valve timings tVTm, tVTe are computed based on the engine speed NE and the engine load factor KL. In the example of FIG. 11, the target valve timings tVTm, tVTe are computed using computation maps M01 and M02. The computation map M01 defines the relationship between the target intake valve timing tVTm, and the engine speed NE and the engine load factor KL. The computation map M02 defines the relationship between the target exhaust valve timing tVTe, and the engine speed NE and the engine load factor KL.

Also, the actual valve timings VTm, VTe of the intake and exhaust valves 17, 18 are computed based on detected results of the cam angle sensors 22*m*, 22*e*. Based on the actual valve timings VTm, VTe, the actual valve overlap amount realOL is computed.

Further, based on the engine speed NE and the engine load factor KL, the base correction amount AVVTb is computed. The base correction amount AVVTb is computed using a computation map M03, which defines the relationship between the base correction amount AVVTb, and the engine speed NE and the engine load factor KL.

Based on the computed values of the base correction amount AVVTb, the target valve overlap amount tOL, and the actual valve overlap amount realOL, the VVT correction amount AVVT is computed using the equation (24). The ignition timing is then corrected using the computed VVT correction amount AVVT. Accordingly, the ignition timing is properly corrected according to changes in the internal EGR amount caused by operation of the variable valve actuation mechanisms 11*m*, 11*e*.

This embodiment has the following advantages.

(1) In the above illustrated embodiment, the VVT correction amount AVVT of the ignition timing is computed based on the ratio of a square number of the actual valve overlap amount realOL to a square number of the target valve overlap amount tOL. The ratio of the square numbers represents the ratio of the actual internal EGR amount realEGR to the target internal EGR amount tEGR as shown in the equation (22). Thus, by using the computed VVT correction amount AVVT, the ignition tiing is easily and properly corrected in accordance with changes in the internal EGR amount accompanying operation of the variable valve actuation mechanisms 11*m*, 11*e*.

Since the amount of new air drawn into the cylinder 15 changes according to changes in the internal EGR amount, the intake air amount and the opening degree of the throttle need to be corrected according to changes in the internal EGR amount when the amount of new air is accurately controlled. To control the air-fuel ratio, which corresponds to changes in the amount of introduced new air, the fuel injection amount needs to be corrected according to changes in the internal EGR amount. To deal with changes in the combustion state, which is affected by changes in the internal EGR amount, the injection timing needs to be corrected according to the internal EGR amount. To control the combusted gas present in the cylinder 15 of an internal combustion engine that performs external EGR, the external EGR amount needs to be corrected according to changes in the internal EGR amount. The external EGR refers to recirculation of combusted gas from the exhaust pipe 26 to the intake pipe 25 through a dedicated EGR passage (external EGR passage).

In this manner, control parameters of the engine other than the ignition timing are influenced by changes in the internal EGR amount accompanying operation of the variable valve actuation mechanisms. When correcting such parameters, the correction amount may be computed based on the ratio of the actual valve overlap area to the target valve overlap area, or the ratio of a square number of the actual valve overlap amount to a square number of the target valve overlap amount.

A controlling apparatus for an internal combustion engine according to a second embodiment of the present invention will now be described. The differences from the first embodiment will mainly be discussed below.

According to the above equation (21), the ratio $r_{egr}$ of the actual internal EGR amount realEGR to the target EGR amount tEGR is equal to the actual valve overlap area realAOL to the target valve overlap area tAOL. Also, according to the above equation (22), the ratio $r_{egr}$ is equal to the ratio of the square number of the actual valve overlap amount real OL to the square of the target valve overlap amount tOL. Accordingly, the equations (25), (26) are established. That is, the internal EGR amount $M_{egrALL}$ is proportionate to the valve overlap area AOL, and to the square number of the valve overlap amount OL. In these equations, $k_1$, $k_2$ represent predetermined constants.

$$M_{egrALL} = k_1 \cdot AOL \quad (25)$$

$$M_{egrALL} = k_2 \cdot (OL)^2 \quad (26)$$

Figure 12:
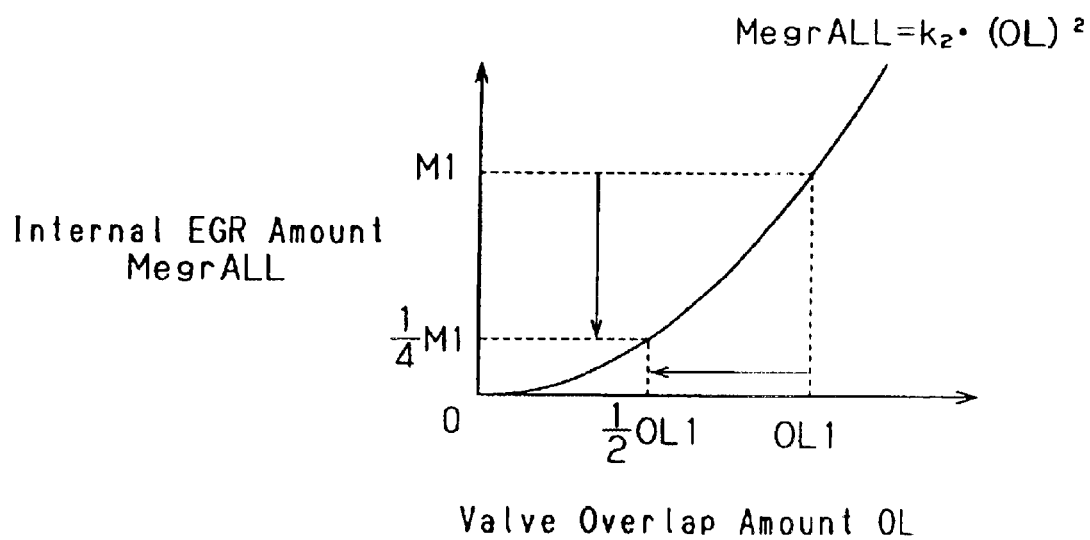
FIG. 12 is a graph showing changes of an internal EGR amount according to changes in the amount of valve overlap.

According to these equations, the states of the variable valve actuation mechanisms 11m, 11e, particularly, the valve overlap area AOL, which is determined according to the states, and the relationship between the valve overlap amount OL and the internal EGR amount are reliably detected. For example, as shown in FIG. 12, if the internal EGR amount $M_{egrALL}$ is reduced to the quarter of the current value, the valve overlap amount OL needs to be reduced to the half the current value.

Therefore, the variable valve actuation mechanisms 11m, 11e are controlled as described in the following items (a) and (b). Accordingly, the internal EGR amount is easily and reliably controlled to seek the target internal EGR amount tEGR.

(a) The variable valve actuation mechanisms 11m, 11e are controlled such that the valve overlap area AOL of the intake and exhaust valves 17, 18 seeks a value computed by multiplying the actual valve overlap area realAOL by the ratio of the target internal EGR amount tEGR to the actual internal EGR amount realEGR.

(b) The variable valve actuation mechanisms 11m, 11e are controlled such that the valve overlap amount OL of the intake and exhaust valves 17, 18 seeks a value computed by multiplying the actual valve overlap amount realOL by the square root of the ratio of the target internal EGR amount tEGR to the actual internal EGR amount realEGR.

The following equations (27), (28) are derived from the above equations (25), (26). In the equations (27), (28), a basic valve overlap area baseAOL, a basic valve overlap amount baseOL, a basic internal EGR amount baseEGR represent the valve overlap area, the valve overlap amount, and the internal EGR amount when the valve timing of the intake and the valve timing of the exhaust valves 17, 18 are a basic target valve timing tbVTm, and tbVTe, respectively.

$$tAOL = baseAOL \times \frac{tEGR}{baseEGR} \quad (27)$$

$$tOL = baseOL \times \sqrt{\frac{tEGR}{baseEGR}} \quad (28)$$

Since the basic valve overlap area baseAOL and the basic valve overlap amount baseOL are determined solely by the basic target valve timings tbVTm, tbVTe, baseAOL and baseOL can be computed based solely on the engine speed and the engine load. Further, since the basic internal EGR amount baseEGR is determined based on the engine speed and the engine load, baseEGR can be computed through experiments beforehand.

According to the equations (27), (28), the valve overlap area and the valve overlap amount, which are used to set the internal EGR amount to a desired value, are easily and reliably obtained. That is, if the variable valve actuation mechanisms 11m, 11e are controlled such that the actual valve overlap area and the actual valve overlap amount seek the target valve overlap area tAOL and the target valve overlap amount tOL computed by the equations (27), (28), the internal EGR amount are accurately controlled.

An example in which this method is applied to a limit control of the internal EGR.

Figure 13:
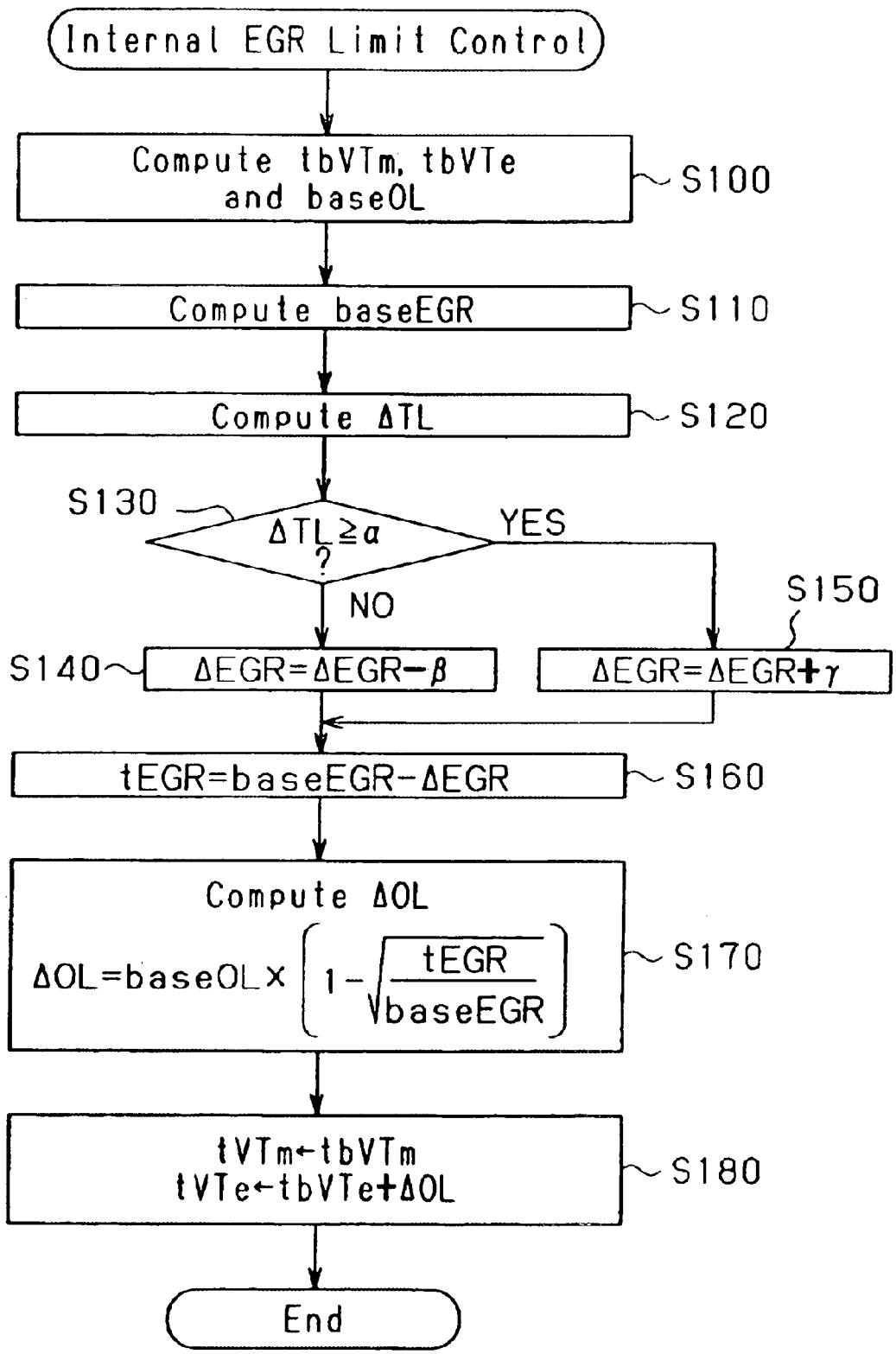
FIG. 13 is a flowchart showing a routine of a limit control of an internal EGR according to a second embodiment.

FIG. 13 shows a flowchart of a routine of a limit control of an internal EGR according to this embodiment. The electronic control unit 20 periodically executes the routine of FIG. 13 as an interruption.

When the routine is started, the basic target valve timings tbVTm, tbVTe of the intake and exhaust valves 17, 18 are computed in step 100. The computation of the valve timings tbVTm, tbVTe is executed using computation maps based on the engine speed NE and the engine load. Also, in step 100, the basic valve overlap amount baseOL is computed using the computed basic target valve timings tbVTm, tbVTe. The basic valve overlap amount baseOL represents the valve overlap amount when the valve timings of the intake and exhaust valves are the basic target valve timings tbVTm, tbVTe.

In step 110, the basic internal EGR amount baseEGR is computed based on the engine speed NE and the engine load factor KL. The basic internal EGR amount baseEGR represents the internal EGR amount under the current engine speed NE and the engine load factor KL on the assumption that the valve timings of the intake and exhaust valves are equal to the valve timings tbVTm, tbVTe.

In step 120, a torque fluctuation amount ΔTL is computed determination value α is determined. The determination value α is slightly less than the upper limit value of a permitted range of the torque fluctuation amount ΔTL, or slightly less than the lowest value of the torque fluctuation amount ΔTL, which represents unstable combustion.

If the torque fluctuation amount ΔTL is equal to or more than the determination value α (positive outcome in step 130), a predetermined value γ is added to an internal EGR reduction value ΔEGR in step 140. If the torque fluctuation amount ΔTL is less than the determination value α (negative outcome in step 130), a predetermined value β is subtracted from the internal EGR reduction value ΔEGR. The predetermined value β is less than the predetermined value γ.

The internal EGR reduction value ΔEGR represents the amount of internal EGR amount which should be reduced from the basic internal EGR amount baseEGR. When the internal EGR reduction amount ΔEGR has a negative value, the internal EGR amount is increased compared to the basic internal EGR amount baseEGR.

After the internal EGR amount ΔEGR is set, the target internal EGR amount tEGR is computed using the basic internal EGR amount baseEGR and the internal EGR reduction value ΔEGR based on the following equation (29) in step 160.

$$tEGR = baseEGR - \Delta EGR \quad (29)$$

Figure 14:
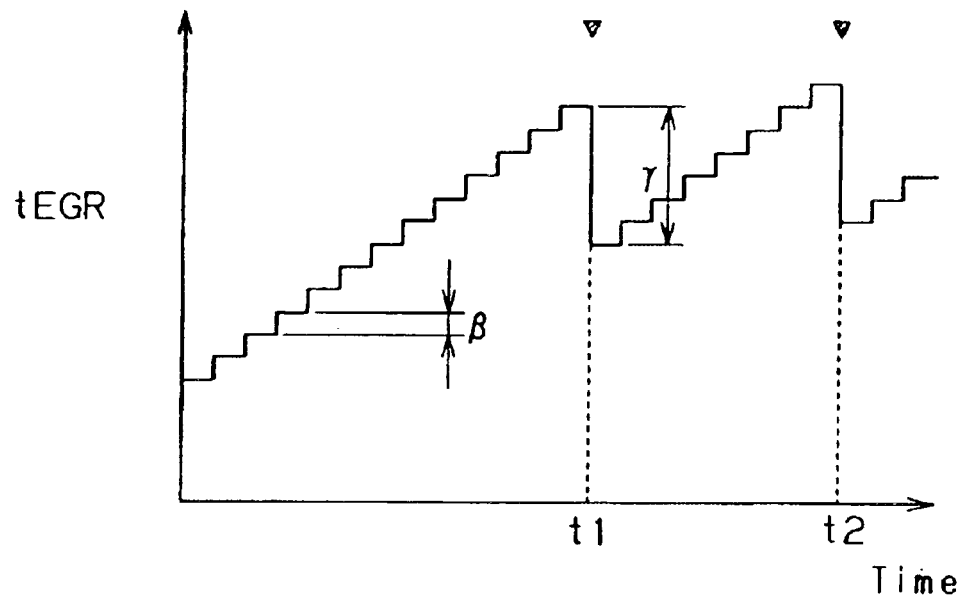
FIG. 14 is a time chart showing an example of an operation of the routine shown in FIG. 13 for controlling a target internal EGR amount.
Figure 15:
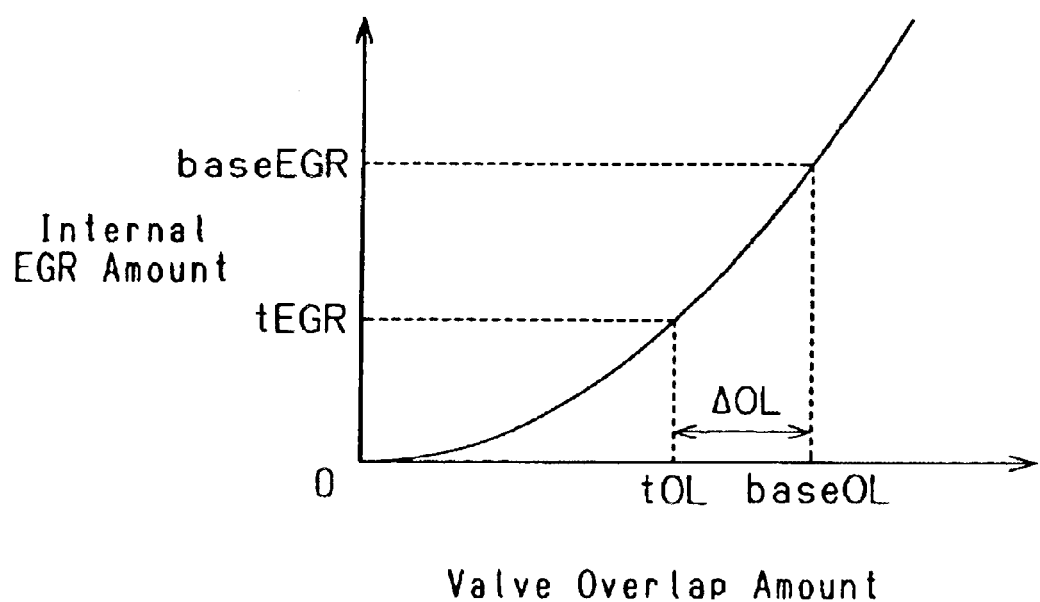
FIG. 15 is a graph showing changes in an internal EGR amount according to changes in the amount of valve overlap.

FIG. 14 shows an example of the procedure for setting the target internal EGR amount tEGR according to the routine shown in FIG. 13. As shown in FIG. 14, the target internal EGR amount tEGR is gradually increased by the predetermined value β when the torque fluctuation amount ΔTL is less than the determination value α. On the other hand, when the internal β when the torque fluctuation amount ΔTL is less than the determination value α. On the other hand, when the internal EGR amount is excessive, and the torque fluctuation amount ΔTL reaches and exceeds the determination value α due to the unstable combustion (at times t1, t2 in FIG. 14), the target internal EGR amount tEGR is significantly reduced by the predetermined value γ. Accordingly, the target internal EGR amount tEGR is increased to a value close to the maximum value in a range that does not cause the combustion to be unstable.

Therefore, by controlling the variable valve actuation mechanisms 11*m*, 11*e* such that the internal EGR amount seeks the taraget internal EGR amount tEGR, the internal EGR amount is maximized in a range that maintain a favorable combustion. Accordingly, the fuel consumption and the amount of exhaust emission are reduced. The target valve timings tVTm, tVTe, which are required to control the internal EGR amount, are computed in steps 170 and 180.

In step 170, a limit correction amount ΔOL is computed using the following equation (30). The limit correction amount ΔOL represents the difference between the basic valve overlap amount baseOL and the target valve overlap amount tOL.

$$\Delta OL = baseOL \times \left(1 - \sqrt{\frac{tEGR}{baseEGR}}\right) \quad (30)$$

In step 180, the basic target valve timings tbVTm, tbVTe are corrected such that the valve overlap amount is reduced by the limit correction amount ΔOL, so that the final target valve timings tVTm, tVTe are computed. In the present example, the basic target valve timing tbVTe of the exhaust valve 18 is advanced by the limit correction amount ΔOL to obtain the final target valve timing tVTe (tVTe=tbVTe+ΔOL). On the other hand, the basic target valve timing tbVTm of the intake valve 17 is used as the final valve timing tVTm (tVTm=tbVTm).

The electronic control unit 20 sets the final target valve timings tVTm, tVTe of the intake and exhaust valves 17, 18 in this manner, and temporarily suspends the current routine. When the variable valve mechanisms 11*m*, 11*e* are controlled based on the final target valve timings tVTm, tVTe, the valve overlap amount OL of the intake and exhaust valves 17, 18 will be the target valve overlap amount tOL, and the internal EGR amount is adjusted to the target internal EGR amount tEGR.

This embodiment has the following advantages.

(1) In this embodiment, the variable valve actuation mechanisms 11*m*, 11*e* are controlled such that the target valve overlap amount tOL, which is a value computed by multiplying the basic valve overlap amount baseOL by the square root of the ratio of the target internal EGR amount tEGR to the basic internal EGR amount baseEGR. Accordingly, the internal EGR amount is controlled to be the target internal EGR amount tEGR. In this embodiment, the variable valve actuation mechanisms 11*m*, 11*e* are controlled based on the relationship between the internal EGR amount and the valve overlap amount expressed by the equation (22), and the internal EGR amount is adjusted, accordingly. Thus, the internal EGR amount is accurately controlled.

It should be apparent to those skilled in the art that the present invention may be embodied in many other specific forms without departing from the spirit or scope of the invention. Particularly, it should be understood that the invention may be embodied in the following forms.

In the computation logic shown in FIG. 11, the VVT correction amount AVVT is computed using the equation (24) based on the actual valve overlap amount realOL and the target valve overlap amount tOL. However, the equation (23) may be used to obtain the VVT correction amount AVVT. In this case, the actual valve overlap area realAOL and the target valve overlap area tAOL can be computed from target values and current values of the valve timings of the intake and exhaust valves 17, 18. Accordingly, the present invention may be applied even if the valve overlap area AOL cannot be assumed to be proportional to the square number of the valve overlap amount OL.

In the limit control routing of the internal EGR shown in FIG. 13, the target valve timings tVTm, tVTe of the intake and exhaust valves 17, 18 are computed based on the relationship between the valve overlap amount and the internal EGR amount, which is expressed by the equation (28). The target valve timings tVTm, tVTe may be computed based on the relationship between the valve overlap area and the internal EGR amount, which is shown in the equation (27). Accordingly, the present invention may be applied even if the valve overlap area AOL cannot be assumed to be proportional to the square number of the valve overlap amount OL.

The computation of the VVT correction amount AVVT in the first embodiment may be obtained in the following manner. First, the actual internal EGR amount realEGR and the target internal EGR amount tEGR are computed using, for example, the equation (15). Then, as shown in the equation (17), the VVT correction amount AVVT is computed based on the ratio of the actual internal EGR amount realEGR to the target internal EGR amount tEGR.

As long as the internal EGR amount is adjusted by changing the valve overlap state by the variable valve actuation mechanisms, the control of the variable valve actuation mechanisms with respect to adjustment of the internal EGR amount in the second embodiment may be applied to controls other than the limit control of the internal EGR described with reference to FIG. 13. In any case, if the variable valve actuation mechanisms 11*m*, 11*e* are controlled based on the relationships expressed by the equations (21), (22), the internal EGR amount is easily and accurately controlled.

In the illustrated embodiments, the present invention is applied to the engine 10, in which the variable valve actuation mechanisms 11*m*, 11*e* vary the valve timings of the intake valve 17 and the exhaust valve 17, respectively. However, the present invention may be applied to an engine in which a single variable valve actuation mechanism is provided at either of the intake valve or the exhaust valve. Also, the present invention may be applied to an engine having other types of variable valve actuation mechanisms, such as a mechanism for varying valve lift. That is, the present invention may be applied to any type of internal combustion engines in which the valve overlap of the intake and exhaust valves are changed by the variable valve actuation mechanisms.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling an internal combustion engine, wherein the engine includes an intake valve, an exhaust valve, and a variable valve actuation mechanism, wherein the variable valve actuation mechanism actuates at least one of the valves to change a state of valve overlap, in which the valves are both opened, wherein an internal EGR amount changes according to a state of the variable valve actuation mechanism, wherein the internal EGR amount is the amount of combusted gas that exists in a cylinder of the engine when air-fuel mixture is combusted in the cylinder, the apparatus comprising:

a computer, wherein, according to changes in the internal EGR amount accompanying actuation of the variable valve actuation mechanism, the computer corrects an engine control amount that is influenced by changes in the internal EGR amount, wherein the computer computes a correction amount used in the correction of the engine control amount based on the ratio of an actual internal EGR amount to a target internal EGR amount, the ratio of an actual valve overlap area to a target valve overlap area, or the ratio of a square number of an actual valve overlap amount to a square number of a target valve overlap amount.

2. The apparatus according to claim 1, wherein the computer determines a control target of the valve overlap state according to a running state of the engine, and wherein the variable valve actuation mechanism actuates at least one of the intake valve and the exhaust valve such that the valve overlap state seeks the determined control target.

3. The apparatus according to claim 2, wherein the running state of the engine includes a rotation speed of the engine and load applied to the engine.

4. The apparatus according to claim 3, wherein the computer obtains a base correction amount based on the rotation speed of the engine and the load applied to the engine, and wherein the computer computes the correction amount by multiplying the base correction amount by the ratio.

5. The apparatus according to claim 2, wherein the actual internal EGR amount is a current value of the internal EGR amount, and wherein the target internal EGR amount is an internal EGR amount when the valve overlap state is equal to the control target.

6. The apparatus according to claim 5, wherein the computer obtains the target internal EGR amount based on a rotation speed of the engine and load applied to the engine.

7. The apparatus according to claim 2, wherein the actual valve overlap area is a current value of the valve overlap area, and wherein the target valve overlap area is a valve overlap area when the valve overlap state is equal to the control target.

8. The apparatus according to claim 7, wherein the valve overlap area corresponds to a time integral of effective opening areas of the intake valve and the exhaust valve in a period during which the valves are both opened.

9. The apparatus according to claim 2, wherein the actual valve overlap amount is a current value of the valve overlap amount, and wherein the target valve overlap amount is a valve overlap amount when the valve overlap state is equal to the control target.

10. The apparatus according to claim 9, wherein the computer obtains the target valve overlap amount based on a rotation speed of the engine and load applied to the engine.

11. The apparatus according to claim 1, wherein the engine control amount includes at least one of ignition timing of air-fuel mixture in the cylinder, an amount of air drawn into the cylinder, and an amount of fuel injection, and timing of fuel injection.

12. An apparatus for controlling an internal combustion engine, wherein the engine includes an intake valve, an exhaust valve, and a variable valve actuation mechanism, wherein the variable valve actuation mechanism actuates at least one of the valves to change a state of valve overlap, in which the valves are both opened, wherein an internal EGR amount changes according to a state of the variable valve actuation mechanism, wherein the internal EGR amount is the amount of combusted gas that exists in a cylinder of the engine when air-fuel mixture is combusted in the cylinder, the apparatus comprising:

a controller, which controls the variable valve actuation mechanism to adjust the internal EGR amount to a predetermined target internal EGR amount, and wherein the controller controls the variable valve actuation mechanism such that a valve overlap area of the intake and exhaust valves becomes a value obtained by multiplying an actual valve overlap area by the ratio of the target internal EGR amount to an actual internal EGR amount or such that a valve overlap amount of the intake and exhaust valves becomes a value obtained by multiplying an actual valve overlap amount by the square root of the ratio of the target internal EGR amount to an actual EGR amount.

13. The apparatus according to claim 12, wherein the valve overlap area corresponds to a time integral of effective opening areas of the intake valve and the exhaust valve in a period during which the valves are both opened.

14. The apparatus according to claim 12, wherein the valve overlap amount corresponds to a period during which the intake valve and the exhaust valve are both opened, which period is expressed in units of rotation angle of an output shaft of the engine.

15. The apparatus according to claim 12, wherein the controller determines the target internal EGR amount according to a degree of torque fluctuation of the engine.

16. An apparatus for controlling an internal combustion engine, wherein the engine includes an intake valve, an exhaust valve, and a variable valve actuation mechanism, wherein the variable valve actuation mechanism actuates at least one of the valves to change a state of valve overlap, in which the valves are both opened, wherein an internal EGR amount changes according to a state of the variable valve actuation mechanism, wherein the internal EGR amount is the amount of combusted gas that exists in a cylinder of the engine when air-fuel mixture is combusted in the cylinder, the apparatus comprising:

a controller, which controls the variable valve actuation mechanism to adjust the internal EGR amount to a predetermined target internal EGR amount, wherein the controller computes a basic valve overlap area based on a rotation speed of the engine and load applied to the engine, wherein the controller also computes a basic internal EGR amount that is an internal EGR amount when a valve overlap area of the intake and exhaust valves is equal to the basic valve overlap area, and wherein the controller controls the variable valve actuation mechanism such that the valve overlap area becomes a value obtained by multiplying the basic valve overlap area by the ratio of the target internal EGR amount to the basic internal EGR amount.

17. The apparatus according to claim 16, wherein the controller determines the target internal EGR amount according to a degree of torque fluctuation of the engine.

18. An apparatus for controlling an internal combustion engine, wherein the engine includes an intake valve, an exhaust valve, and a variable valve actuation mechanism, wherein the variable valve actuation mechanism actuates at least one of the valves to change a state of valve overlap, in which the valves are both opened, wherein an internal EGR amount changes according to a state of the variable valve actuation mechanism, wherein the internal EGR amount is the amount of combusted gas that exists in a cylinder of the engine when air-fuel mixture is combusted in the cylinder, the apparatus comprising:

a controller, which controls the variable valve actuation mechanism to adjust the internal EGR amount to a predetermined target internal EGR amount, wherein the controller computes a basic valve overlap amount based on a rotation speed of the engine and load applied to the engine, wherein the controller also computes a basic internal EGR amount that is an internal EGR amount when a valve overlap amount of the intake and exhaust valves is equal to the basic valve overlap amount, and wherein the controller controls the variable valve actuation mechanism such that the valve overlap amount becomes a value obtained by multiplying the basic valve overlap amount by the square root of the ratio of the target internal EGR amount to the basic internal EGR amount.

19. The apparatus according to claim 18, wherein the controller determines the target internal EGR amount according to a degree of torque fluctuation of the engine.

* * * * *